(12) United States Patent
Gobster

(10) Patent No.: US 9,314,037 B1
(45) Date of Patent: Apr. 19, 2016

(54) MEAT AGING ASSEMBLY

(71) Applicant: Joseph Gobster, Costa Mesa, CA (US)

(72) Inventor: Joseph Gobster, Costa Mesa, CA (US)

(*) Notice: Subject to any disclaimer, the term of this patent is extended or adjusted under 35 U.S.C. 154(b) by 355 days.

(21) Appl. No.: 13/967,445

(22) Filed: Aug. 15, 2013

(51) Int. Cl.
| | |
|---|---|
| *A23F 3/00* | (2006.01) |
| *A23L 3/00* | (2006.01) |
| *A23B 4/015* | (2006.01) |
| *A21B 3/04* | (2006.01) |
| *A23L 3/28* | (2006.01) |
| *A47F 3/04* | (2006.01) |

(52) U.S. Cl.
CPC . *A23B 4/015* (2013.01); *A21B 3/04* (2013.01); *A23L 3/28* (2013.01); *A47F 3/0413* (2013.01); *A47F 3/0495* (2013.01)

(58) Field of Classification Search
CPC ... A47F 3/0495; A47F 3/0413; A47F 3/0408; A23L 3/28; A23L 3/3409; A21B 3/04
USPC ........... 99/357, 451, 467, 468, 469, 474, 476, 99/484; 62/247, 249, 259.4, 314
See application file for complete search history.

(56) References Cited

U.S. PATENT DOCUMENTS

| | | | |
|---|---|---|---|
| 2,560,057 A | 7/1951 | Williams | |
| 3,857,254 A | 12/1974 | Lobel | |
| 5,470,597 A | 11/1995 | Mendenhall | |
| D534,999 S | 1/2007 | Hussaini et al. | |
| 7,258,064 B2 * | 8/2007 | Vaseloff et al. | 99/468 |
| 7,296,422 B2 * | 11/2007 | Strohm et al. | 62/78 |
| 7,998,517 B2 | 8/2011 | Burke | |
| 8,426,777 B2 * | 4/2013 | Elston et al. | 219/391 |
| 2007/0095093 A1 * | 5/2007 | Narayanamurthy | 62/434 |
| 2008/0105140 A1 * | 5/2008 | Lee et al. | 99/468 |
| 2009/0266095 A1 * | 10/2009 | Pruneri | 62/231 |
| 2010/0154452 A1 | 6/2010 | McCann | |
| 2012/0042664 A1 | 2/2012 | Lee et al. | |

* cited by examiner

Primary Examiner — Reginald L Alexander

(57) ABSTRACT

A meat aging assembly for eliminating bacteria while the meat ages includes a housing that may store meat. A tray is positioned within the housing so the meat is positioned upon the tray. A door is operationally coupled to the housing so the door closes the housing. A refrigeration unit, a humidity control unit and a fan are operationally coupled to the housing to condition air within an interior of the housing to age the meat. A radiation emitter is operationally coupled to the housing so the radiation emitter emits radiation onto the meat. A control panel is coupled to the housing and a timer is coupled to the housing. The timer alerts a user to passage of a selected duration of time. A power supply is coupled to the housing and the power supply is operationally coupled to the control panel.

14 Claims, 5 Drawing Sheets

MEAT AGING ASSEMBLY

BACKGROUND OF THE DISCLOSURE

Field of the Disclosure

The disclosure relates to meat aging devices and more particularly pertains to a new meat aging device for eliminating bacteria while the meat ages.

SUMMARY OF THE DISCLOSURE

An embodiment of the disclosure meets the needs presented above by generally comprising a housing that may store meat. A tray is positioned within the housing so the meat is positioned upon the tray. A door is operationally coupled to the housing so the door closes the housing. A refrigeration unit is operationally coupled to the housing. The refrigeration unit conditions a temperature of air within an interior of the housing so the meat is aged. A humidity control unit is operationally coupled to the housing. The humidity control unit conditions a moisture level of the air within the interior of the housing so the meat is aged. A fan is operationally coupled to the housing so the fan urges the air within the interior of the housing. A radiation emitter is operationally coupled to the housing so the radiation emitter emits radiation onto the meat. A control panel is coupled to the housing. The control panel is operationally coupled to the refrigeration unit, the humidity control unit, the fan and the radiation emitter. A timer is coupled to the housing so the timer notifies a user when a pre-selected duration of time has passed. A power supply is coupled to the housing and the power supply is operationally coupled to the control panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
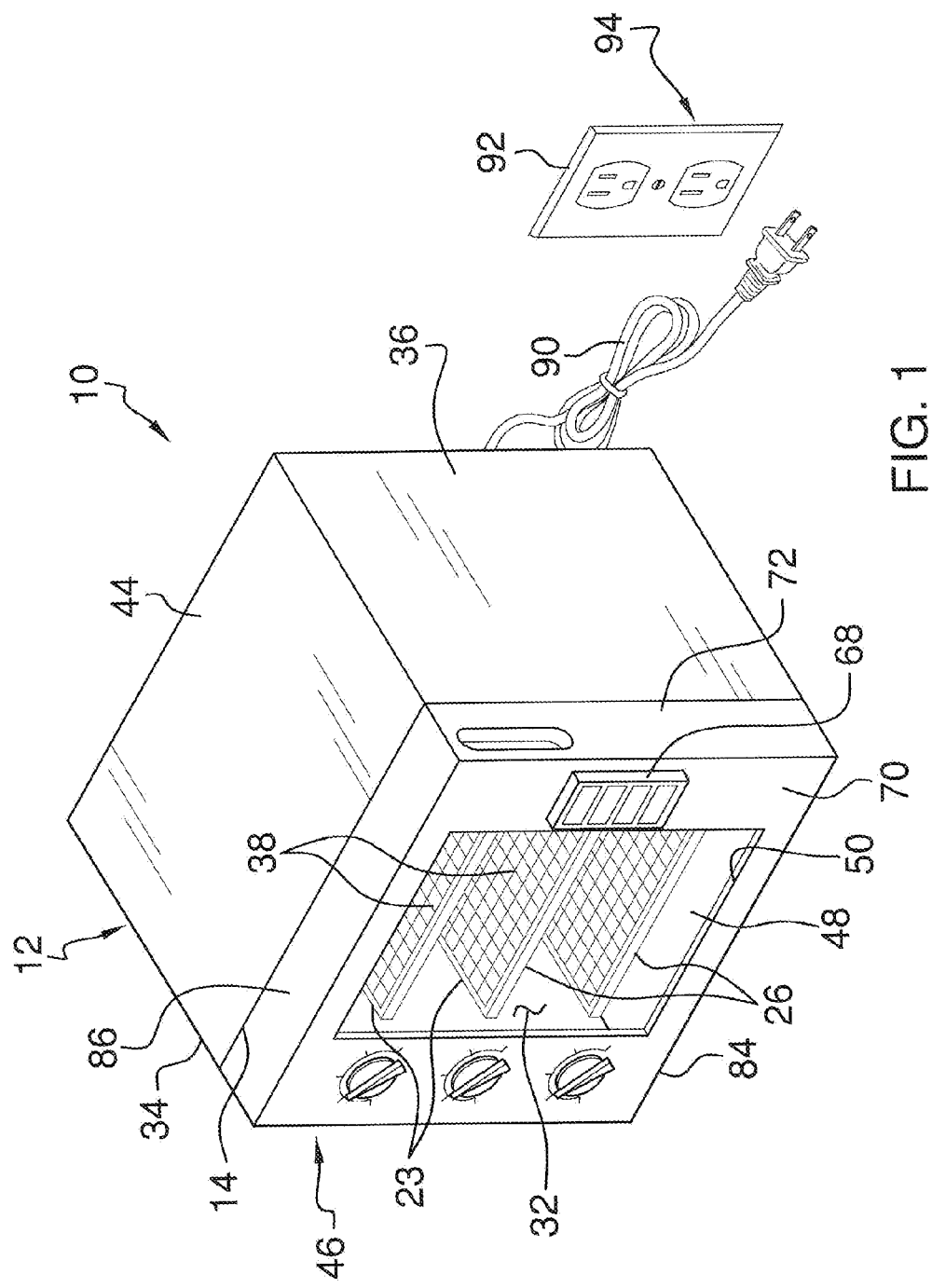
FIG. 1 is a perspective view of a meat aging assembly according to an embodiment of the disclosure.
Figure 2:
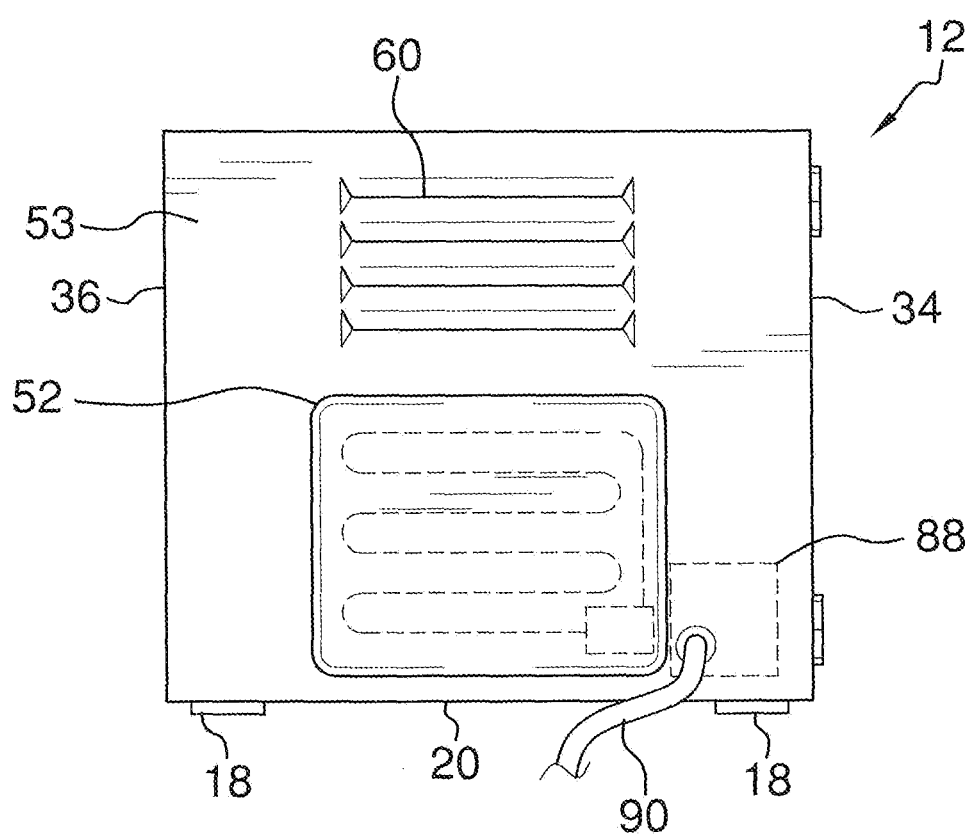
FIG. 2 is a back side view of an embodiment of the disclosure.
Figure 3:
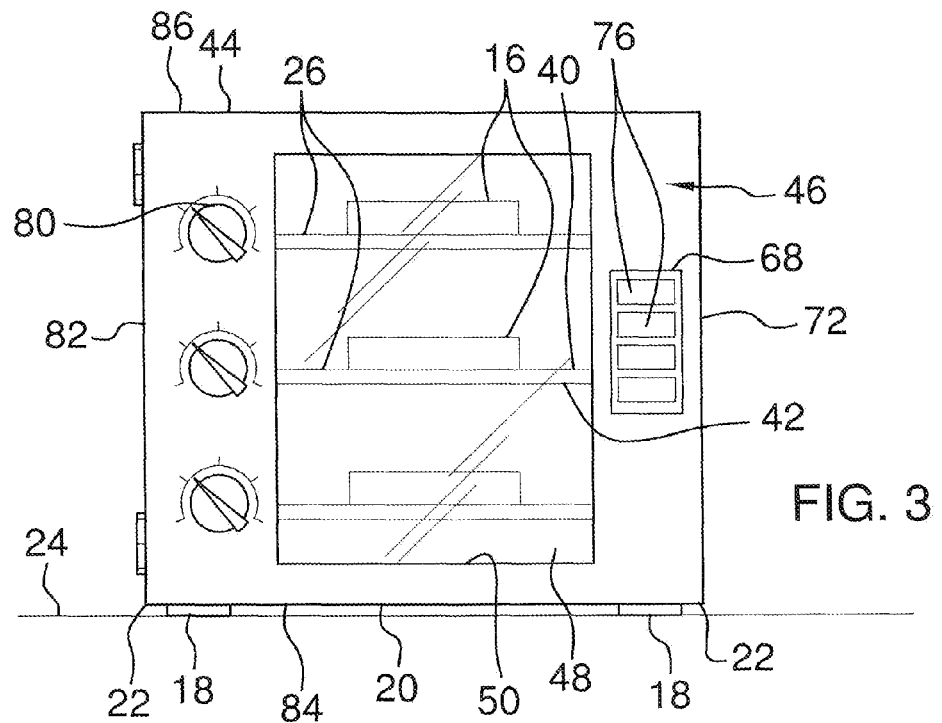
FIG. 3 is a front side view of an embodiment of the disclosure.
Figure 4:
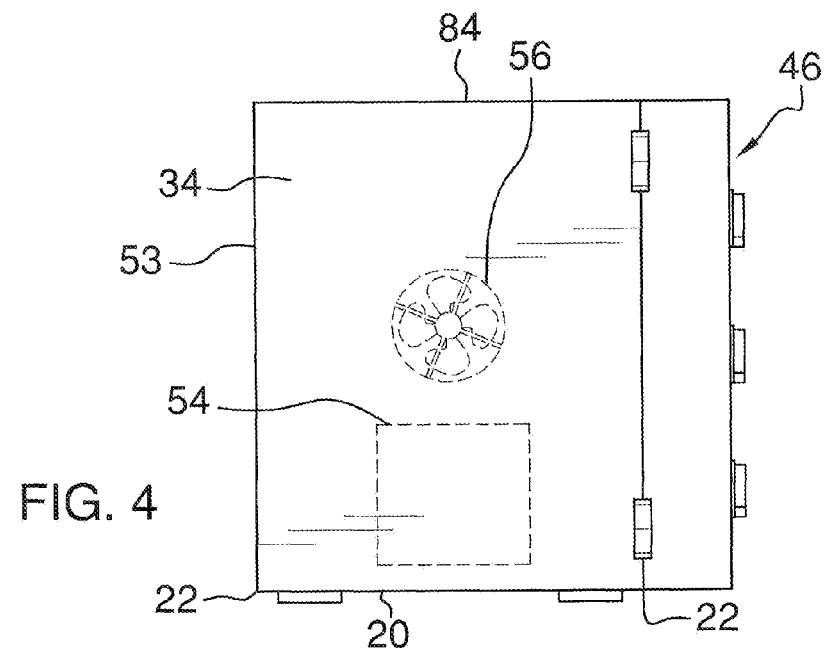
FIG. 4 is a left side view of an embodiment of the disclosure.
Figure 5:
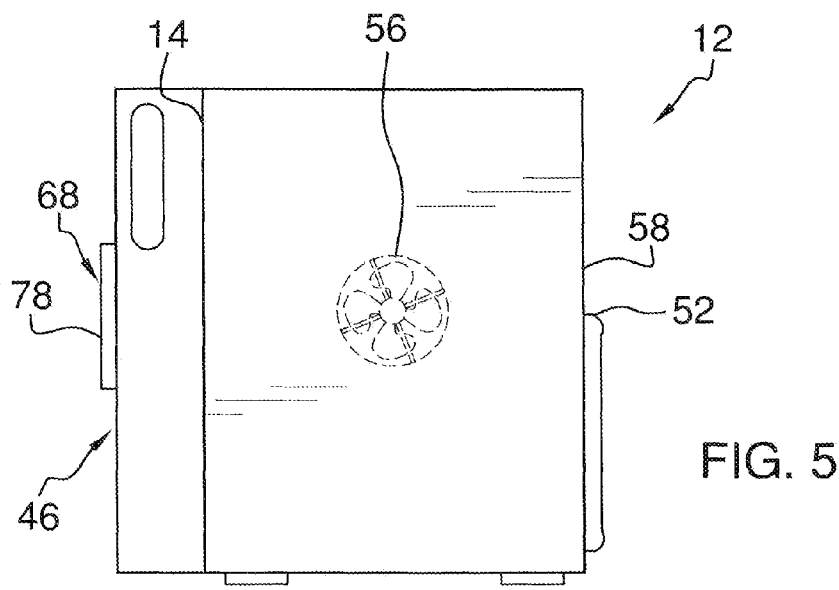
FIG. 5 is a right side view of an embodiment of the disclosure.
Figure 6:
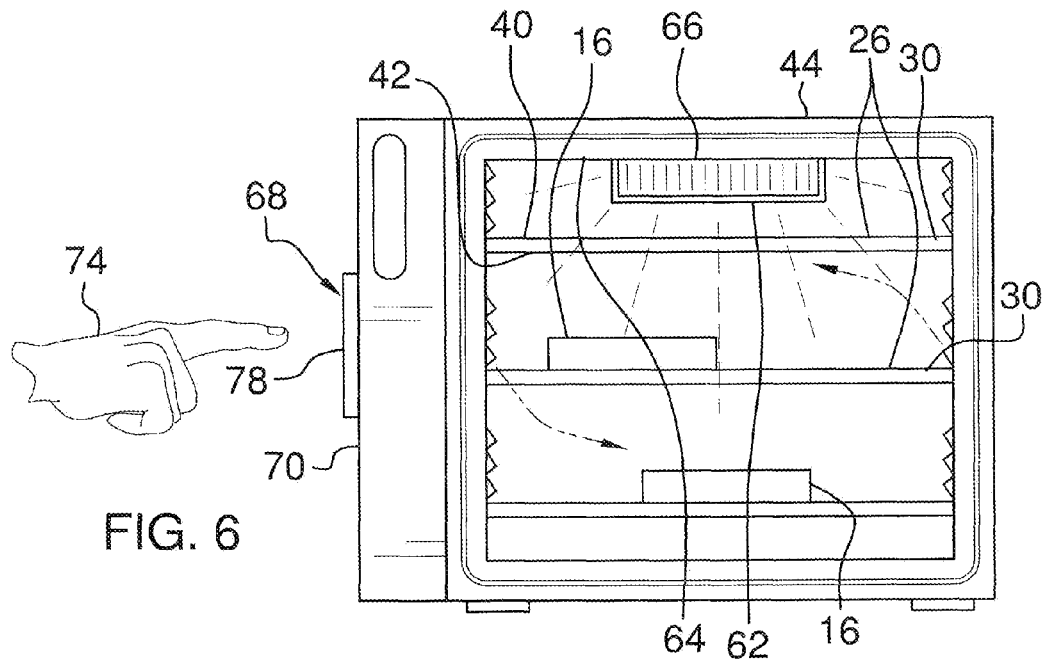
FIG. 6 is an in use view of an embodiment of the disclosure.
Figure 7:
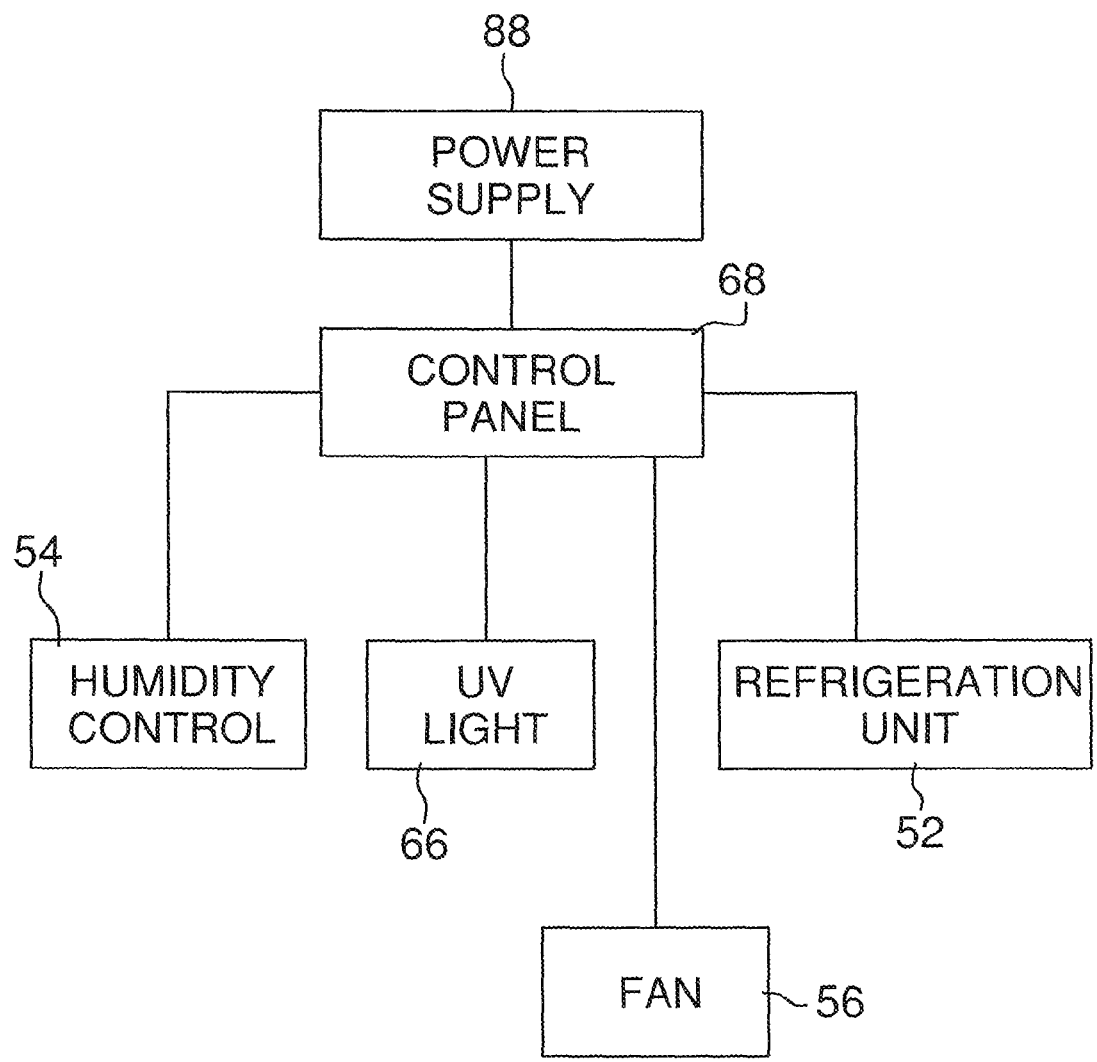
FIG. 7 is a schematic view of an embodiment of the disclosure.

With reference now to the drawings, and in particular to FIGS. 1 through 7 thereof, a new meat aging device embodying the principles and concepts of an embodiment of the disclosure and generally designated by the reference numeral 10 will be described.

As best illustrated in FIGS. 1 through 7, the meat aging assembly 10 generally comprises a housing 12 that has an open front side 14 to access an interior of the housing 12. The housing 12 may store meat 16. The meat 16 may be raw meat that needs to be aged before being cooked. Further, the housing 12 may have a height between 81 cm and 101 cm, a width between 81 cm and 101 cm, and a depth between 71 cm and 81 cm. A plurality of feet 18 is each coupled to a bottom wall 20 of the housing 12 proximate an associated one of four corners 22 of the bottom wall 20 of the housing 12. The plurality of feet 18 abut a support surface 24 so the housing 12 is supported above the support surface 24.

A tray 26 is removably positionable within the interior of the housing 12. An associated one of a first lateral edge 28 and a second lateral edge 30 of the tray 26 engages an inside surface 32 of each of an associated one of a first lateral wall 34 and a second lateral wall 36 of the housing 12 so the tray 26 is retained within the interior of the housing 12. A plurality of openings 38 extends through a top 40 and a bottom 42 side of the tray 26 so air may pass through the tray 26. Further, the tray 26 is one of a plurality of trays 26 that are evenly distributed between the bottom wall 20 and a top wall 44 of the housing 12. The meat 16 is selectively positionable on the top 40 of each of the plurality of the trays 26 so the air may circulate around the meat 16.

A door 46 is hingedly coupled to the open front side 14 of the housing 12. The door 46 is positionable between an open position exposing the interior of the housing 12 and a closed position closing the interior of the housing 12. A window 48 completely covers an opening 50 in the door 46 so the interior of the housing 12 is visible when the door 46 is closed.

A refrigeration unit 52 is coupled to a back wall 53 of the housing 12 so the refrigeration unit 52 is in fluid communication with the interior of the housing 12. The refrigeration unit 52 maintains the temperature of the air within the interior of the housing 12 between a minimum and a maximum temperature. Additionally, the minimum temperature may be 35° F. and the maximum temperature may be 40° F. The refrigeration unit 52 conditions the air to maximize the aging qualities of the meat 16. Finally, the refrigeration unit 52 may be a compressor based refrigeration unit of any conventional design.

A humidity control unit 54 is coupled to the first lateral wall 34 of the housing 12 so the humidity control unit 54 is in fluid communication with interior of the housing 12. The humidity control unit 54 maintains the moisture content of the air within the interior of the housing 12 between a minimum and a maximum moisture content. Additionally, the minimum moisture content may be 75% humidity and the maximum moisture content may be 80% humidity. The humidity control unit 54 may be a de-humidifier of any conventional design.

A fan 56 is rotatably coupled to an inside surface 58 of the first lateral wall 34 of the housing 12. The fan 56 selectively urges the air within the interior of the housing 12 outwardly through a vent 60 positioned on the back wall 53 of the housing 12. In addition, the fan 56 urges the air to improve the aging process of the meat 16. The fan 56 may have a diameter between 5 cm and 8 cm.

A radiation emitter 62 is coupled to an inside surface 64 of the top wall 44 of the housing 12. The radiation emitter 62 selectively emits radiation within the interior of the housing 12. Continuing, the radiation emitter 62 comprises a UV light 66 of any conventional design. The UV light 66 may have an operational output between 8 W and 25 W. Lastly, the UV radiation kills bacteria on the meat 16 to maximize the freshness of the meat 16 while the meat 16 ages in the housing 12.

A control panel 68 is coupled to a front side 70 of the door 46 proximate a second lateral side 72 of the door 46 so the control panel 68 is accessible to a user 74. An actuator 76 is coupled to a front 78 of the control panel 68 so the actuator 76 is selectively engaged by the user 74. The actuator 76 is one of a plurality of actuators 76 that are each electrically coupled to an associated one of the refrigeration unit 52, the humidity control unit 54, the fan 56 and the radiation emitter 62. Additionally, the plurality of actuators 76 each selectively actuates and de-actuates the associated one of the refrigeration unit 52, the humidity control unit 54, the fan 56 and the radiation emitter 62. The user 74 may choose any combination of the refrigeration unit 52, the humidity control unit 54, the radiation emitter 62 and the fan 56 to be actuated simultaneously or individually.

A timer 80 is coupled to the front side 70 of the door 46 proximate a first lateral side 82 of the door 46 so the timer 80 is accessible to the user 74. The timer 80 is one of a plurality of timers 80 that are evenly distributed between a top side 84 and a bottom side 86 of the door 46. Further, each of the timers 80 is aligned with a corresponding one of the plurality of trays 26 when the door 46 is in the closed position. The timer 80 may be set between a minimum and a maximum amount of time. When the selected duration of time expires, the timer 80 emits an audible alarm to alert the user 74.

A power supply 88 is coupled to the housing 12. The power supply 88 is electrically coupled to each of the plurality of actuators 76. Further, the power supply 88 includes a power cord 90 that extends away from the back wall 53 of the housing so the power cord 90 may be electrically coupled to a power source 92. The power source 92 may comprise a female electrical outlet 94.

In use, the user 74 places the meat 16 on a selected one of the trays 26. Each of the trays 26 may have meat 16 placed on them at different times, and the associated timer 80 may be set to help the user 74 keep track of how long each tray 26 has been aging the meat 16. The user 74 actuates the refrigeration unit 52, the humidity control unit 54, the radiation emitter 62 and the fan 56 either simultaneously or individually. Further, the user 74 may actuate any combination of the refrigeration unit 52, the humidity control unit 54, the radiation emitter 62 and the fan 56. The user 74 ages the meat 16 in the housing 12 in order to prevent cross contamination of the meat 16 with other food products.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A meat aging assembly for eliminating bacteria while the meat ages, said assembly comprising:
    a housing configured to store meat;
    a plurality of trays, each tray being positioned within said housing;
    a door operationally coupled to said housing wherein said door closes said housing;
    a refrigeration unit operationally coupled to said housing wherein said refrigeration unit conditions a temperature of air within an interior of said housing;
    a humidity control unit operationally coupled to said housing wherein said humidity control unit conditions a moisture level of the air within the interior of said housing;
    a fan operationally coupled to said housing wherein said fan urges the air within the interior of said housing;
    a radiation emitter operationally coupled to said housing wherein said radiation emitter emits radiation into said interior space of said housing such that said radiation emitter is configured to emit radiation onto the meat;
    a control panel coupled to said housing, said control panel being operationally coupled to said refrigeration unit, said humidity control unit, said fan and said radiation emitter;
    a timer coupled to said housing wherein said timer notifies a user when a pre-selected duration of time has passed, said timer being coupled to a front side of said door proximate a first lateral side of said door wherein said timer is accessible to a user, said timer being one of a plurality of said timers, said timers being evenly distributed between a top side and a bottom side of said door such that each of said timers is laterally aligned with a corresponding one of a plurality of said trays and each said tray is laterally aligned with a corresponding one of said timers; and
    a power supply coupled to said housing, said power supply being operationally coupled to said control panel.

2. The assembly according to claim 1, further comprising said housing having an open front side to access the interior of said housing.

3. The assembly according to claim 1, further comprising said tray being removably positionable within the interior of said housing wherein an associated one of a first lateral edge and a second lateral edge of said tray engages an inside surface of each of an associated one of a first lateral wall and a second lateral wall of said housing wherein said tray is retained within the interior of said housing.

4. The assembly according to claim 3, further comprising said tray being one of a plurality of said trays being evenly distributed between a bottom wall and a top wall of said housing.

5. The assembly according to claim 1, further comprising said door being hingedly coupled to an open front side of said housing wherein said door is positionable between an open position exposing the interior of said housing and a closed position closing the interior of said housing.

6. The assembly according to claim 1, further comprising said refrigeration unit being in fluid communication with the interior of said housing wherein said refrigeration unit maintains the temperature of the air within the interior of said housing between a minimum and a maximum temperature.

7. The assembly according to claim 1, further comprising said humidity control unit being in fluid communication with interior of said housing wherein said humidity control unit maintains the moisture content of the air within the interior of said housing between a minimum and a maximum moisture content.

8. The assembly according to claim 1, further comprising said fan being rotatably coupled to said housing wherein said fan selectively urges the air within the interior of said housing outwardly through a vent positioned on a back wall of said housing.

9. The assembly according to claim 1, further comprising said radiation emitter being coupled to an inside surface of a top wall of said housing wherein said radiation emitter selectively emits radiation within the interior of said housing.

10. The assembly according to claim 1, further comprising said control panel being coupled to a front side of said door proximate a second lateral side of said door wherein said control panel is accessible to a user.

11. The assembly according to claim 1, further comprising an actuator coupled to a front of said control panel wherein said actuator is selectively engaged by the user.

12. The assembly according to claim 11, further comprising said actuator being one of a plurality of said actuators each being electrically coupled to an associated one of said refrigeration unit, said humidity control unit, said fan and said radiation emitter wherein said plurality of actuators each selectively actuates and de-actuates the associated one of said refrigeration unit, said humidity control unit, said fan and said radiation emitter.

13. The assembly according to claim 1, further comprising:
    said power supply being electrically coupled to each of a plurality of actuators; and
    said power supply including a power cord extending away from a back wall of said housing wherein said power cord is configured to be electrically coupled to a power source.

14. A meat aging assembly for eliminating bacteria while the meat ages, said assembly comprising:
    a housing having an open front side to access an interior of said housing wherein said housing is configured to store meat;
    a tray being removably positionable within the interior of said housing wherein an associated one of a first lateral edge and a second lateral edge of said tray engages an inside surface of each of an associated one of a first lateral wall and a second lateral wall of said housing wherein said tray is retained within the interior of said housing, said tray being one of a plurality of said trays being evenly distributed between a bottom wall and a top wall of said housing wherein the meat is selectively positionable on a top of each of said plurality of said trays;
    a door hingedly coupled to said open front side of said housing wherein said door is positionable between an open position exposing the interior of said housing and a closed position closing the interior of said housing;
    a refrigeration unit coupled to said housing wherein said refrigeration unit is in fluid communication with the interior of said housing wherein said refrigeration unit maintains the temperature of the air within the interior of said housing between a minimum and a maximum temperature;
    a humidity control unit coupled to said housing wherein said humidity control unit is in fluid communication with interior of said housing wherein said humidity control unit maintains the moisture content of the air within the interior of said housing between a minimum and a maximum moisture content;
    a fan rotatably coupled to said housing wherein said fan selectively urges the air within the interior of said housing outwardly through a vent positioned on a back wall of said housing;
    a radiation emitter coupled to an inside surface of a top wall of said housing wherein said radiation emitter selectively emits radiation within the interior of said housing;
    a control panel coupled to a front side of said door proximate a second lateral side of said door wherein said control panel is accessible to a user;
    an actuator coupled to a front of said control panel wherein said actuator is selectively engaged by the user, said actuator being one of a plurality of said actuators each being electrically coupled to an associated one of said refrigeration unit, said humidity control unit, said fan and said radiation emitter wherein said plurality of actuators each selectively actuates and de-actuates the associated one of said refrigeration unit, said humidity control unit, said fan and said radiation emitter;
    a timer coupled to said housing, said timer being coupled to a front side of said door proximate a first lateral side of said door wherein said timer is accessible to a user, said timer being one of a plurality of said timers, said timers being evenly distributed between a top side and a bottom side of said door such that each of said timers is laterally aligned with a corresponding one of a plurality of said trays and each said tray is laterally aligned with a corresponding one of said timers; and
    a power supply coupled to said housing, said power supply being electrically coupled to each of said plurality of actuators, said power supply including a power cord extending away from a back wall of said housing wherein said power cord is configured to be electrically coupled to a power source.

* * * * *